US009573683B2

(12) United States Patent
Martin et al.

(10) Patent No.: US 9,573,683 B2
(45) Date of Patent: Feb. 21, 2017

(54) COLLAPSIBLE MULTI-ROTOR UAV

(71) Applicant: Arch Aerial LLC, Houston, TX (US)

(72) Inventors: Benjamin Martin, Houston, TX (US); Rebecca Rapp, Houston, TX (US)

(73) Assignee: ARCH-AERIAL, LLC, Houston, TX (US)

( * ) Notice: Subject to any disclaimer, the term of this patent is extended or adjusted under 35 U.S.C. 154(b) by 72 days.

(21) Appl. No.: 14/697,597

(22) Filed: Apr. 27, 2015

(65) Prior Publication Data

US 2015/0321755 A1    Nov. 12, 2015

Related U.S. Application Data

(60) Provisional application No. 61/985,319, filed on Apr. 28, 2014.

(51) Int. Cl.
| | | |
|---|---|---|
| *B64C 27/08* | (2006.01) | |
| *B64C 39/02* | (2006.01) | |
| *B64C 27/50* | (2006.01) | |

(52) U.S. Cl.
CPC ............ *B64C 39/024* (2013.01); *B64C 27/08* (2013.01); *B64C 27/50* (2013.01); *B64C 2201/024* (2013.01); *B64C 2201/027* (2013.01); *B64C 2201/108* (2013.01)

(58) Field of Classification Search
CPC ..... B64C 39/024; B64C 39/028; B64C 27/08; B64C 27/50; B64C 2201/20; B64C 2201/027; B64C 2201/108; B64C 1/30
USPC ........................................... 244/17.23, 17.27
See application file for complete search history.

(56) References Cited

U.S. PATENT DOCUMENTS

| 8,695,919 B2* | 4/2014 | Shachor | ................ B64C 39/022 |
| | | | 244/17.11 |
| 2010/0108801 A1* | 5/2010 | Olm | ......................... B64C 1/30 |
| | | | 244/17.23 |

OTHER PUBLICATIONS

14697597MQ600date—forum archive of MQ600 UAV establishing date and specifications.*
14697597MQ600Pic—product pictures and specifications of MQ600.*
14697597XuGongBuildLog_0_1—dated manual for XuGong-10 UAV.*
14697597XuGongFolded—product picture showing arms folded.*

* cited by examiner

*Primary Examiner* — Richard A Davis
(74) *Attorney, Agent, or Firm* — Ray K. Shahani

(57) ABSTRACT

A multi-rotor UAV having a pull pin mechanism that engages and disengages the rotor arms from a deployed, in-flight position to a storage or transport configuration, thus making the UAV more portable and capable of carrying larger payloads with the flexibility of folding into a smaller configuration or profile for transport, such as in a backpack. The device includes a rotor arm utilization of a pull pin mechanism to lock and unlock the position of the arms, and a proprietary frame.

8 Claims, 9 Drawing Sheets

COLLAPSIBLE MULTI-ROTOR UAV

RELATED APPLICATION(S)

This application is continuation-in-part of and related to U.S. Provisional Patent Application Ser. No. 61/985,319 filed Apr. 28, 2014, entitled COLLAPSIBLE MULTI-ROTOR UAV, which is incorporated herein by reference in its entirety, and claims any and all benefits to which it is entitled therefrom.

FIELD OF THE INVENTION

This invention relates to a proprietary design for a multi-rotor, unmanned aerial vehicle (hereafter "UAV"), and more particularly to a collapsible, quad-rotor UAV.

BACKGROUND OF THE INVENTION

An unmanned aerial vehicle (UAV), commonly known as a drone, is an aircraft without a human pilot aboard. Its flight is controlled either autonomously by onboard computers or by the remote control of a pilot on the ground or in another vehicle. The typical launch and recovery method of an unmanned aircraft is by the function of an automatic system or an external operator on the ground. In general, UAVs are simple, remotely piloted aircraft, but autonomous control is increasingly being employed.

Most designs for multi-rotor UAVs are rigid. The ones that incorporate a compacting or a "fold" configuration usually utilize hinges in order to produce a collapsible design for the prototypes. Hinge mechanisms that rotate motor arms in both vertical and horizontal axes of the UAV have dominated the collapsible UAV design pool. These designs, although successfully reducing the size of the UAVs, are limited due to lack of symmetry and the length of various extremities. Other methods for decreasing the size of a quad rotor UAV in transit include detachable quick release components. Once the extremities of the quad are removed, the size of the case required to protect and transport the UAV unit also decreases. However, these designs which usually utilize small screws and bolts to hold various parts together, presenting a disadvantage in the field when attempting to deploy a UAV unit. Hardware required for assembly gets lost and the time required for deployment can cause delays.

The present invention utilizes design symmetry and a pull pin mechanism to reduce both the space required to transport and the time it takes to deploy a multi-rotor UAV.

DETAILED DESCRIPTION OF THE PREFERRED EMBODIMENT

Figure 1A:
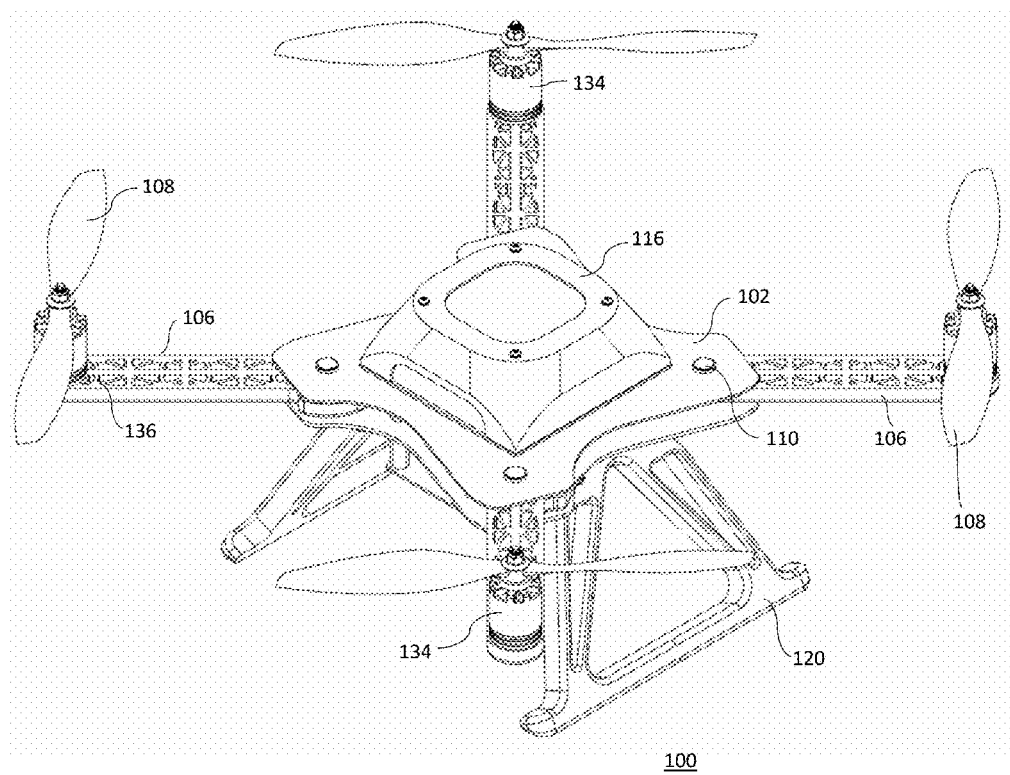
FIG. 1A is a representative isometric view of an embodiment of the collapsible multi-rotor quad-copter UAV of the present invention in a flight configuration.

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

The present invention is unique design for a multi-rotor UAV to reduce the amount of time needed to assemble and deploy a UAV in the field as well as provide a way to compact the UAV into a manageable size for transportation.

The present invention reflects an increase in the size of the body frame and a decrease in the length of motor arms compared to prior models. By reducing the size of the motor arms they can fold symmetrically against the sides of the body. Once in this transport position, a pull pin mechanism locks the motor arms in place. Upon release of the pull pin mechanism, the arms are free to move in the horizontal plane. When fully extended, the pull pin mechanism will securely lock restricting the movement of the motor arms in a deployed position.

Each motor arm pivots around a single bind screw that allows it to move in the horizontal plane. Inserted between the bind screw and the carbon fiber body plate are neoprene washers used to dampen the effects of vibration caused by the motors and allow for the ease of movement between deployed and stored positions. Each motor arm is designed with a grated pattern to allow for a lighter weight and to allow the arm to absorb the force of impact.

The body is designed to allow the arms to fold up against the sides neatly. The design uses carbon fiber for its strength and lightweight properties.

Figure 1B:
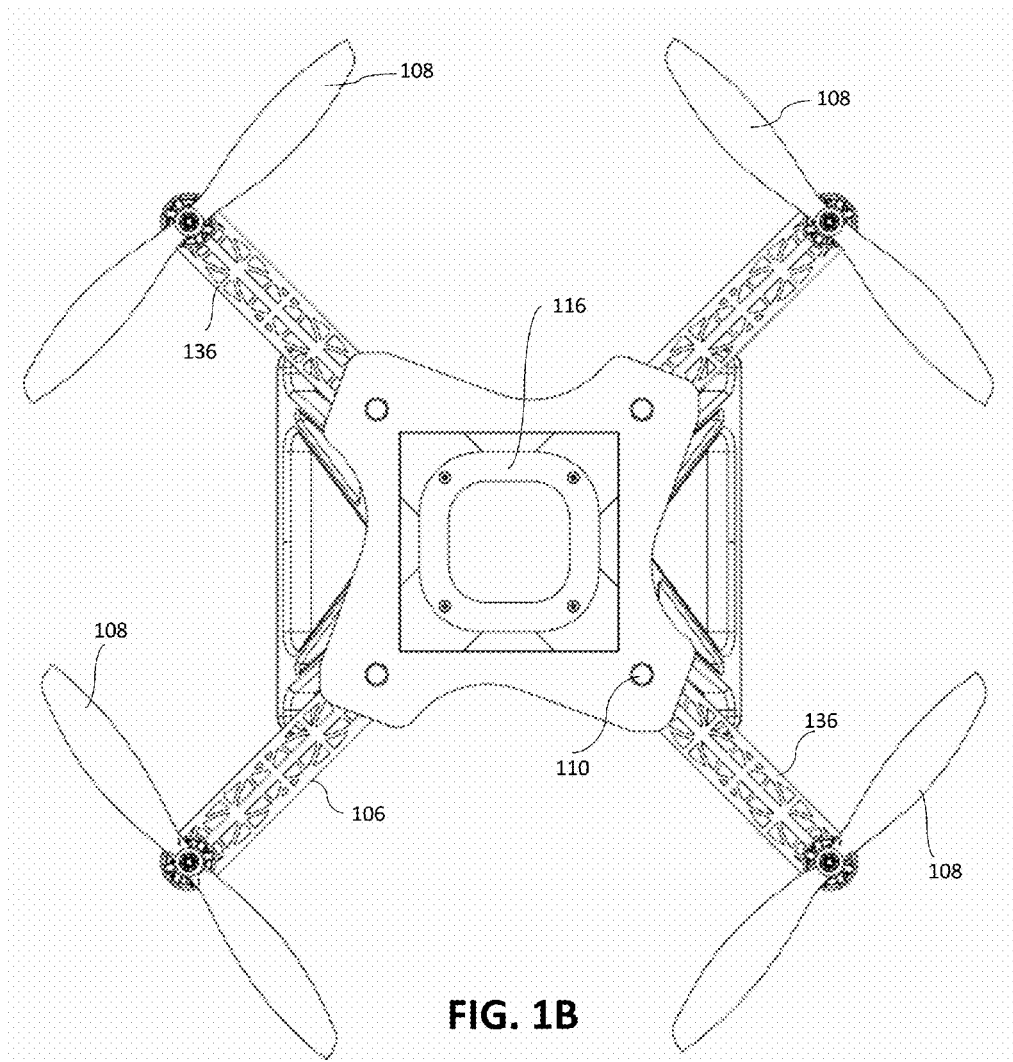
FIG. 1B is a representative top view of an embodiment of the collapsible multi-rotor quad-copter UAV of the present invention in a flight configuration.
Figure 1C:
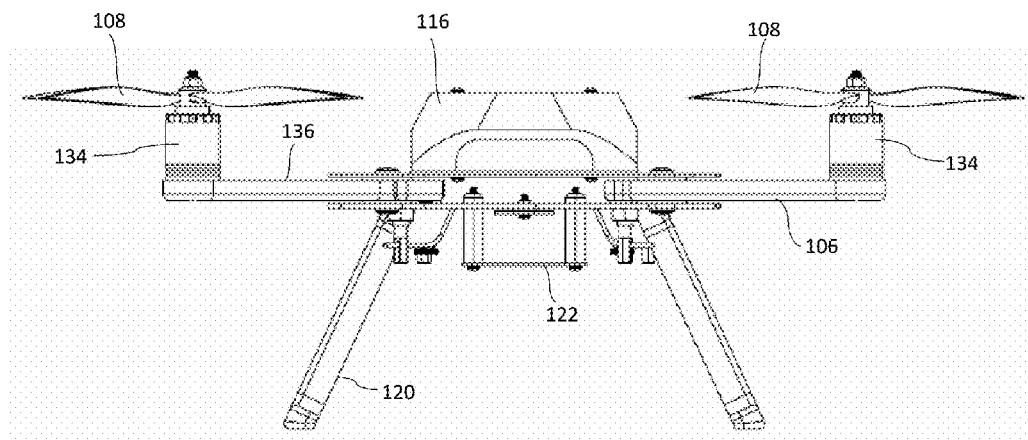
FIG. 1C is a representative front view of an embodiment of the collapsible multi-rotor quad-copter UAV of the present invention in a flight configuration.
Figure 1D:
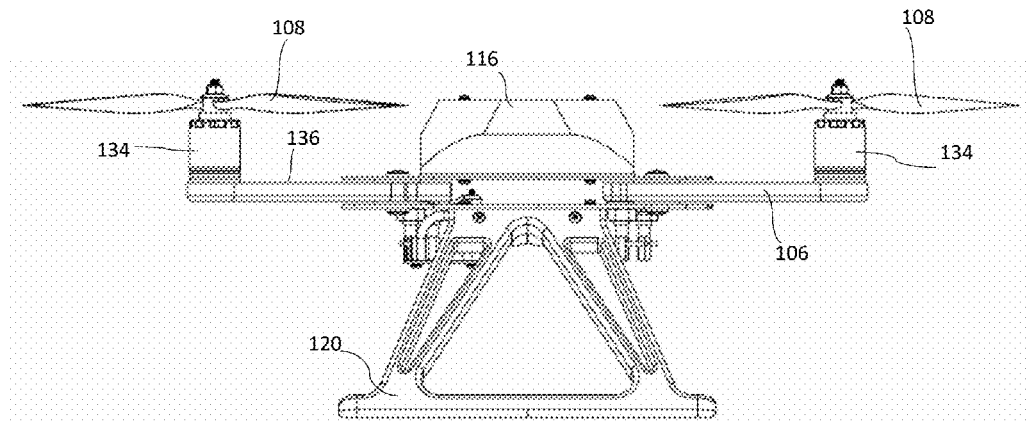
FIG. 1D is a representative side view of an embodiment of the collapsible multi-rotor quad-copter UAV of the present invention in a flight configuration.
Figure 1E:
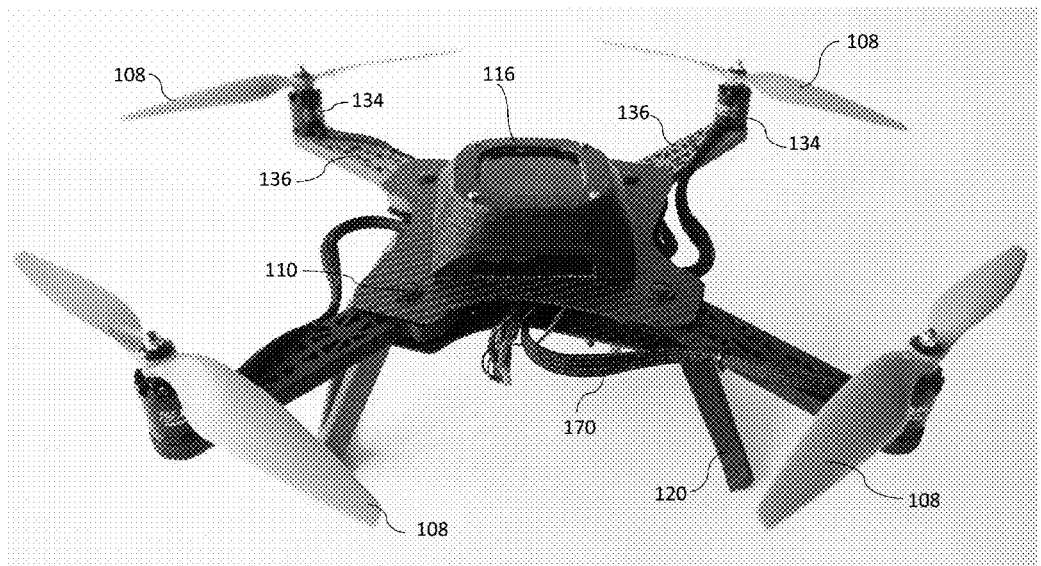
FIG. 1E is another representative isometric view of an embodiment of the collapsible multi-rotor quad-copter UAV of the present invention in a flight configuration.

FIG. 1A is a representative isometric view of an embodiment of the collapsible multi-rotor quad-copter UAV of the present invention in a flight configuration. FIG. 1B is a representative top view of an embodiment of the collapsible multi-rotor quad-copter UAV of the present invention in a flight configuration. FIG. 1C is a representative front view of an embodiment of the collapsible multi-rotor quad-copter UAV of the present invention in a flight configuration. FIG. 1D is a representative side view of an embodiment of the collapsible multi-rotor quad-copter UAV of the present invention in a flight configuration. FIG. 1E is another representative isometric view of an embodiment of the collapsible multi-rotor quad-copter UAV of the present invention in a flight configuration.

UAV 100 consists of a top plate 102 made of carbon fiber or other rigid, durable material, a bottom plate 104 made of similar material, four (4) rotating rotor arms 106 made of molded urethane or similar and four (4) corresponding propellers or rotors 108. Binding screw mechanism 110 sandwiched between the top plate 102 and the bottom plate 104 and provides an axis for rotation of the rotor arms 106. A spring locking pull pin 114, operated manually or via small motors controlled remotely, lock the arms 106 into either the deployed position such as shown in FIGS. 1A-E or the collapsed position such as shown in FIGS. 2A-E.

Molded urethane polymer protective cover 116 protects the flight electronics, provides impact protection and resistance to the elements. support plate 118 made of carbon fiber or other suitable material supports a battery or battery pack. Landing gear 120 made of molded urethane polymer or other suitable material is either permanently mounted to the bottom plate 104, or is secured to the UAV with thumb nuts or similar manually operated coupling. Having removable landing gear 120, the UAV 100 of the present invention can be disassembled and transported or stored efficiently.

A camera mount 122 made of carbon fiber or other rigid, durable material is particularly adapted for downward facing cameras or other sensors, and placing additional camera or sensor mounts on the top of the UAV or on any or all of the sides would be within the scope and purview of the present invention.

Figure 2A:
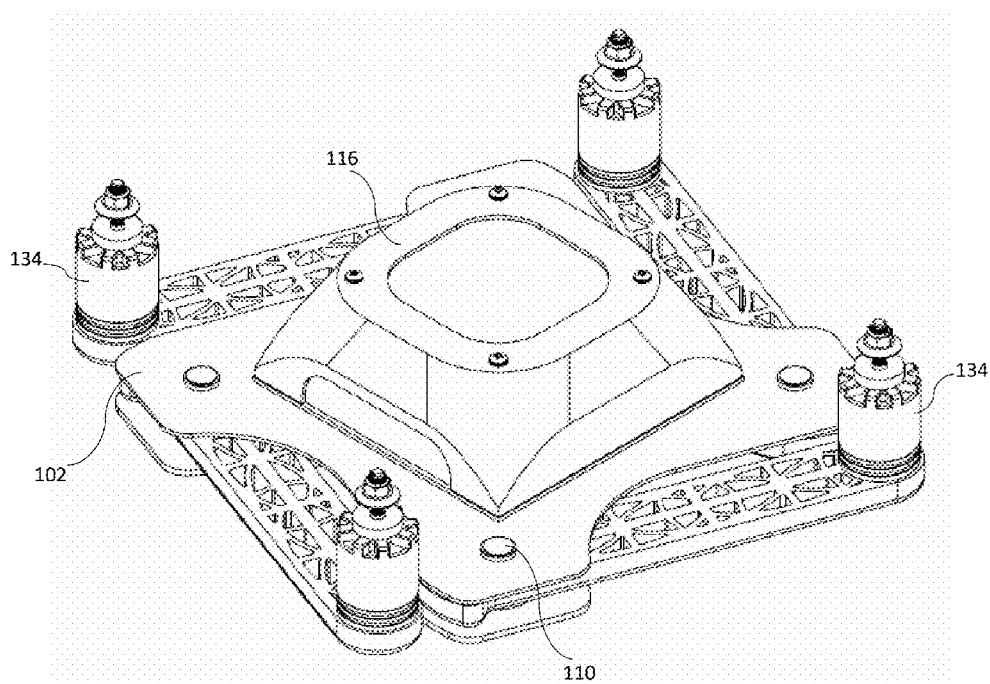
FIG. 2A is a representative isometric view of an embodiment of the collapsible multi-rotor quad-copter UAV of the present invention in a compacted configuration.
Figure 2B:
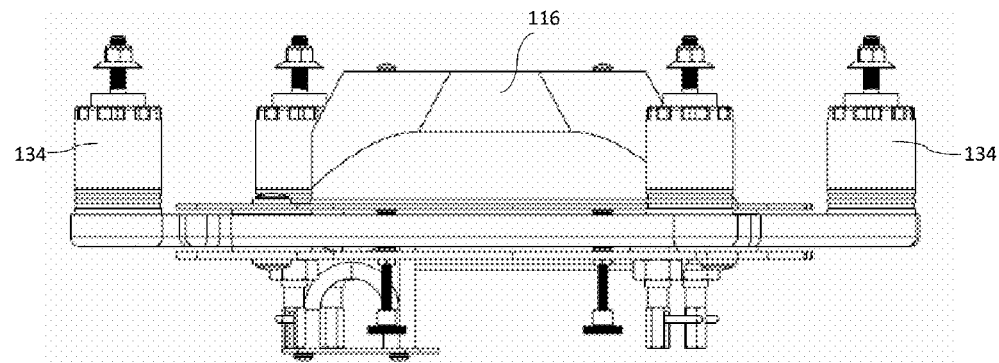
FIG. 2B is a representative side view of an embodiment of the collapsible multi-rotor quad-copter UAV of the present invention in a compacted configuration.
Figure 2C:
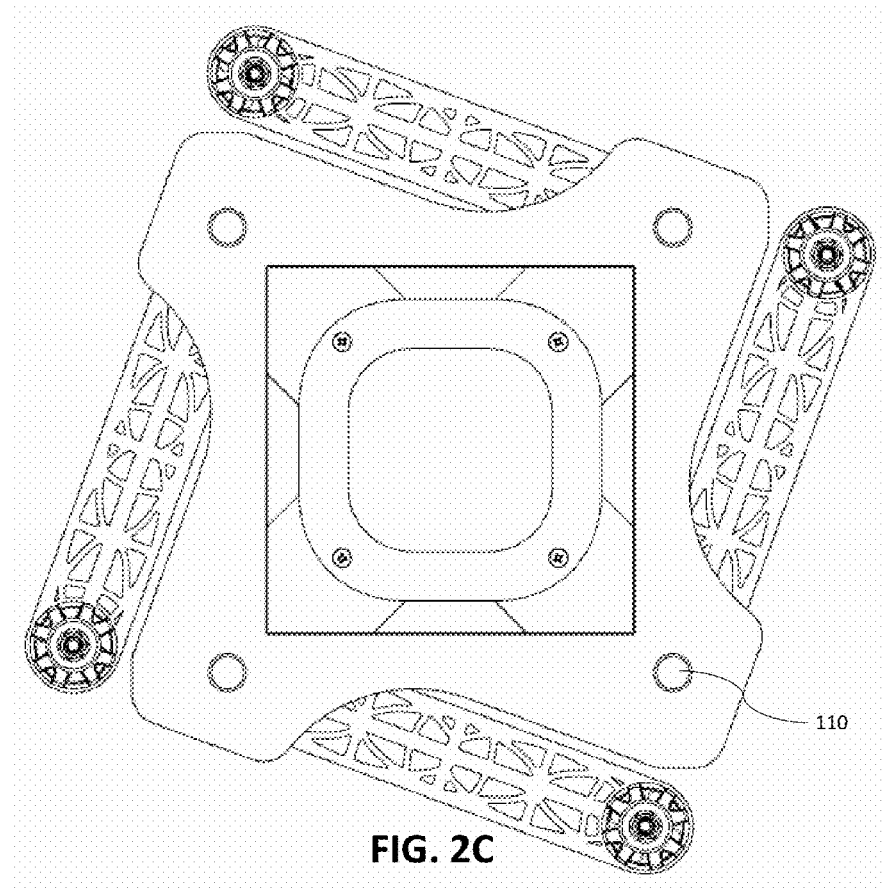
FIG. 2C is a representative top view of an embodiment of the collapsible multi-rotor quad-copter UAV of the present invention in a compacted configuration.
Figure 2D:
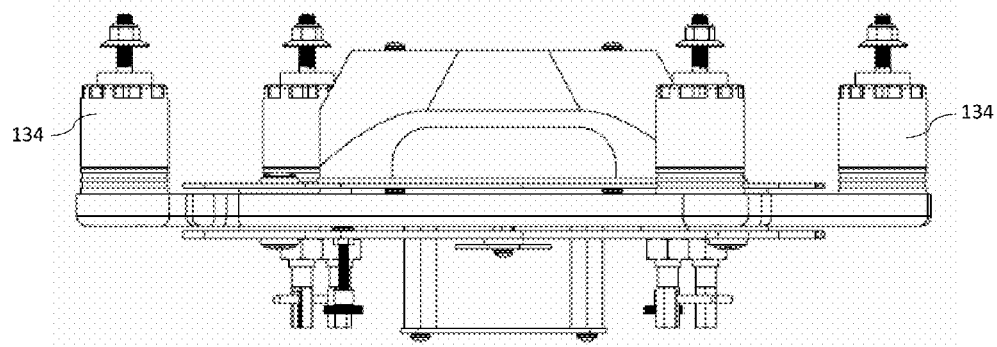
FIG. 2D is a representative front view of an embodiment of the collapsible multi-rotor quad-copter UAV of the present invention in a compacted configuration.
Figure 2E:
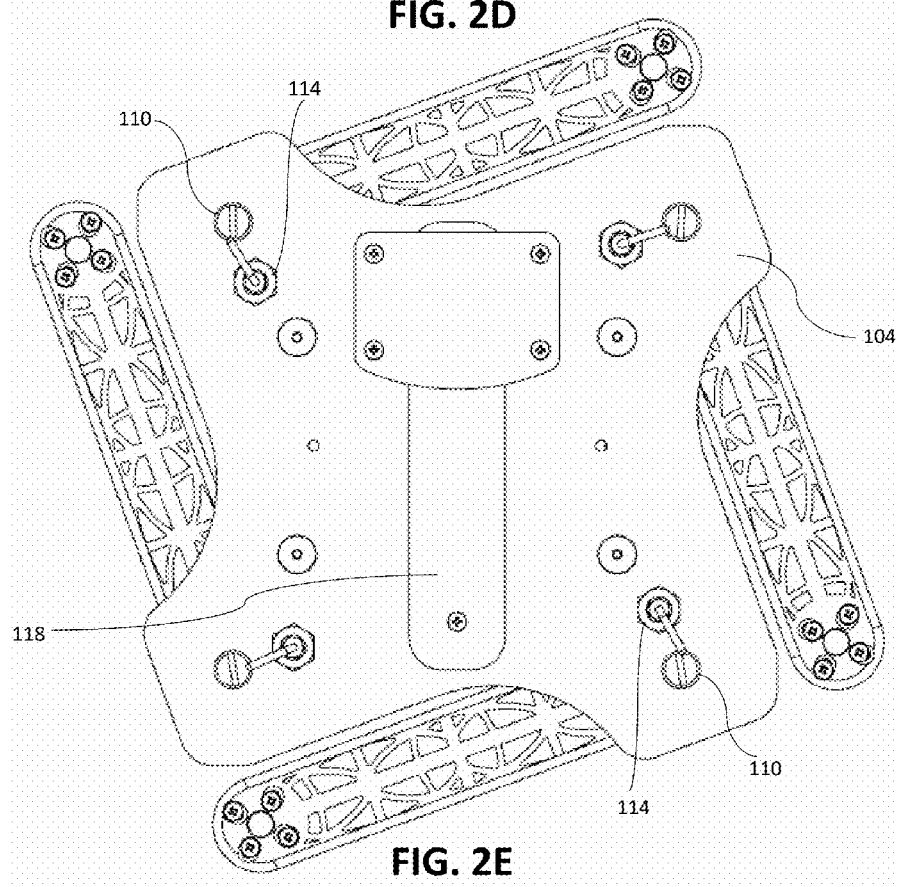
FIG. 2E is a representative lower view of an embodiment of the collapsible multi-rotor quad-copter UAV of the present invention in a compacted configuration.

FIG. 2A is a representative isometric view of an embodiment of the collapsible multi-rotor quad-copter UAV of the present invention in a compacted configuration. FIG. 2B is a representative side view of an embodiment of the collapsible multi-rotor quad-copter UAV of the present invention in a compacted configuration. FIG. 2C is a representative top view of an embodiment of the collapsible multi-rotor quad-copter UAV of the present invention in a compacted configuration. FIG. 2D is a representative front view of an embodiment of the collapsible multi-rotor quad-copter UAV of the present invention in a compacted configuration. FIG. 2E is a representative lower view of an embodiment of the collapsible multi-rotor quad-copter UAV of the present invention in a compacted configuration.

Figure 3A:
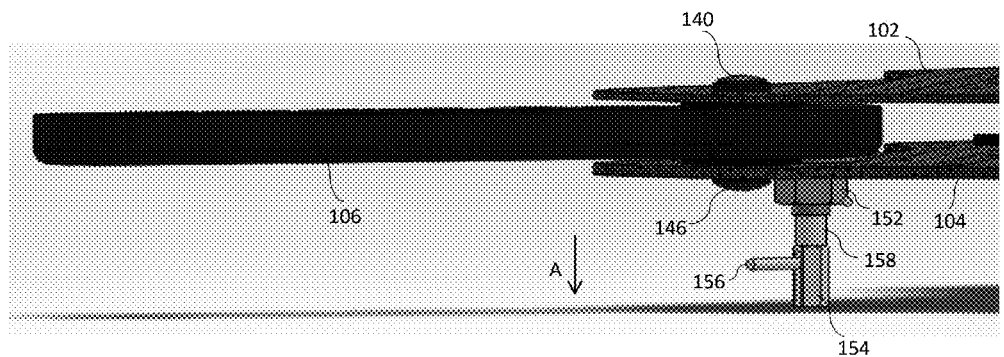
FIG. 3A is a representative partial view of an embodiment of the arm connection of the collapsible multi-rotor quad-copter UAV of the present invention in an assembled configuration.
Figure 3B:
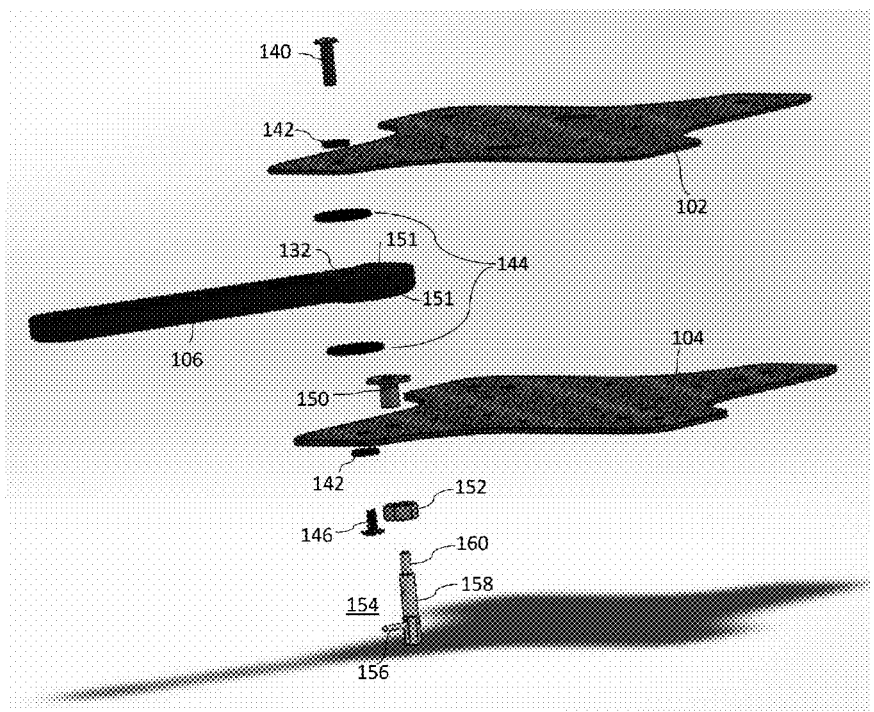
FIG. 3B is a representative exploded partial view of an embodiment of the arm connection of the collapsible multi-rotor quad-copter UAV of the present invention.
Figure 3C:
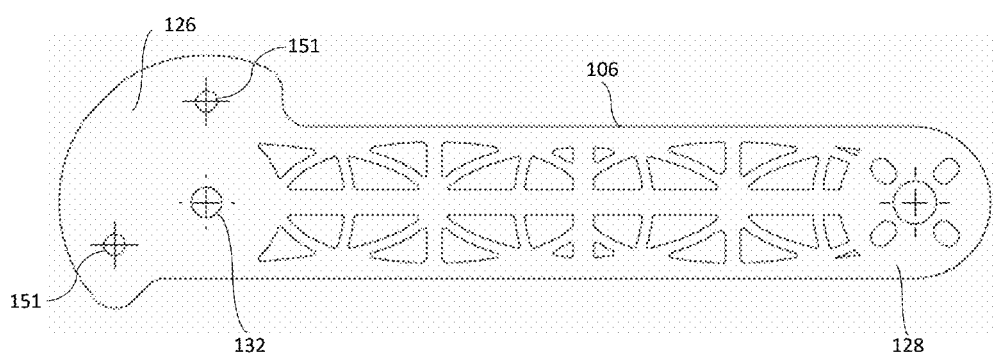
FIG. 3C is a representative view of an embodiment of an arm of the collapsible multi-rotor quad-copter UAV of the present invention in an assembled configuration.

FIG. 3A is a representative partial view of an embodiment of the arm connection of the collapsible multi-rotor quad-copter UAV of the present invention in an assembled configuration. FIG. 3B is a representative exploded partial view of an embodiment of the arm connection of the collapsible multi-rotor quad-copter UAV of the present invention. FIG. 3C is a representative view of an embodiment of an arm of the collapsible multi-rotor quad-copter UAV of the present invention in an assembled configuration.

Rotor arms 106 have a proximal end 126 and a distal end 128. Binding screw mechanism 110 engages rotor arm 106 at axis of rotation point 132. At the distal end 128 of each rotor arm 106, small, brushless electric motors 134 are mounted upon the upper surface 136 of each rotor arm 106 with small machine screws to operate the propellers 108 of the UAV 100 of the present invention.

Binding post mechanism 110 comprises internally threaded binding post 140, first and second small neoprene rubber vibration dampening washers 142, first and second large neoprene rubber vibration dampening washers 144, and binding screw 146. While the rotor arm 106 is sandwiched between large washers 144, the top plate 102 and bottom plate 104 are sandwiched between small washers 142 and large washers 144.

Internally and externally threaded tab nut 150 passes through bottom plate 104. Hex nut 152 threads onto the tab nut 150 secured to bottom plate 104. Pull pin 154 has a lever tip 156 and internal spring (not shown) contained within a central, externally threaded portion 158. Plunger tip 160 extends through tab nut 150 into one of 2 positioning openings in the arm 106 such that upon manual activation of the lever tip 156 in the direction indicated A, plunger tip 160 retracts inside the central portion 158 and permits rotor arms 106 to swing freely between the deployed, flight position shown in FIGS. 1A-1E and the travel, compact configuration shown in FIGS. 2A-E. Then, when the lever tip 156 is released, the plunger tip 160 advances into either one of the positioning arm holes 151 located on the distal end 126 of the rotor am 106.

As mentioned above, top plate 102, bottom plate 104, battery support plate 118 and camera mount 116 are made of carbon fiber twill plate or other suitable, rigid material. Rotor arms 106, landing gear 120 and electronics cover 116 can be made of molded urethane or similar polymer material, while the GPS mounting spacer and camera plate spacer can be made of 3D printed ABS plastic. Neoprene rubber sheeting can be used for forming the large vibration dampening washers 144 or small washers 142, as well as a electronics seal between the cover 116 and top plate 102. Plexiglass or similar plastic can be used for windows such as where transparency is important. Aluminum bind posts and screws are also used.

The UAV 100 uses a standard lithium polymer battery which are available or can be custom fabricated in various shapes and sizes. In a preferred embodiment, the battery is secured between the battery support plate 118 and the lower plate 104 and held in place by a portion of hook and loop material cinch strap that circles the battery and plate 118.

Under the electronics cover 116, the UAV 100 houses the flight electronics. Some of the electronic components are commercially purchased, but all can be custom configured and programmed. The flight electronics of the UAV 100 of the present invention utilize a standard APM 2.5.2 control board as its main flight computer. Coupled to the APM 2.5.2 board are the following components:

A GPS module is utilized for providing accurate location and tracking data;
An air telemetry module provides communication with a ground computer while the UAV 100 is in flight; and
A radio receiver for radio control communication between the UAV 100 and a ground or other user is also part of the flight electronics.

A main power distribution board with combined ESC wiring harness provides a direct power and control connection to each of the 4 small rotor motors 134. Each of the motors 134 is rated at about 800 KV, or more or less. LED strips for orientation lighting are mounted underneath the arms, adjacent the landing gear and may also be attached to the top or sides of the UAV 100, as desired.

Each rotor arm 106 is sandwiched between the top carbon fiber plate 102 and bottom carbon fiber plate 104 by the binding screw mechanism, and is isolated from vibration with large neoprene washer inserts 144 and small washers 142. The spring locking pin mechanism 114 is threaded into and mechanically secured to the bottom carbon fiber plate 104 with a flat tab nut 150 that does not impede the rotation of the arm 106. The arm 106 is "locked" when the spring pin 114 is extended and the plunger tip 160 is held by the force of the internal spring. The arm 106 is "unlocked" when the spring pin 114 is retracted. The central hole 132 located at the proximal end 126 of the arm 106 is the axis of rotation. The two holes 151 further to the edge of the proximal end 126 of the arm 106 are the receiving pinholes for the spring locking pin mechanism 114. The four holes 180 to the edges of the distal end 128 of the arm 106 serve to mechanically mount the brushless electric motor 134 to the arm 106.

It will be understood that the folding rotor arms 106 of the UAV 100 of the present invention can be collapsed, i.e., folded back into a collapsed position when the UAV 100 is being transported or stored such that the motors 136 associated with the rotors 108 define the four outermost corners of a square or rectangle.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

We claim:

1. A collapsible multi-rotor unmanned aerial vehicle (UAV) comprising:
   a top plate;
   a bottom plate;
   a plurality of elongated rotor arms, the plurality of rotor arms having a proximal end and a distal end, the proximal end of the plurality of rotor arms each sandwiched between the top plate and the bottom plate, the proximal end of the plurality of rotor arms each fastened to the top plate and the bottom plate with a binding screw mechanism and a locking pin mechanism, the locking pin mechanism locking the plurality of rotor arms in a fully extended position during a deployed mode and releasing the plurality of rotor arms in a collapsed position against the top plate and the bottom plate, wherein the plurality of binding screw mechanisms are located at a plurality of pivot points which define the outermost corners of the plates;
   a plurality of rotor motors, one attached to the distal end of each of the plurality of rotor arms such that when the plurality of elongated rotor arms are in the collapsed position, the plurality of rotor motors define the outermost corners and perimeter of a square or rectangle;
   a plurality of rotors, one rotor pivotally attached to each of the plurality of rotor motors;
   flight electronics comprising a main flight computer board, the on-board flight electronics further comprising a GPS module, an air telemetry module and a radio receiver each connected to the main flight computer board, the flight electronics further comprising a power distribution board combined with ESCs and LED orientation lighting; and
   a battery for providing electrical power to the plurality of rotor motors and to the on-board flight electronics.

2. The collapsible multi-rotor UAV of claim 1, further comprising:
   a support plate secured on the bottom plate, the support plate providing housing for the battery.

3. The collapsible multi-rotor UAV of claim 1, further comprising:
   a molded polymer protective cover on top of the top plate, the protective cover providing protection to impact, resistance to the elements and housing for electronic components.

4. The collapsible multi-rotor UAV of claim 1, further comprising:
   landing gear, the landing gear coupled to the bottom plate and providing support for the UAV during take-off and landing.

5. The collapsible multi-rotor UAV of claim 1, wherein the locking pin is a spring-loaded locking pin.

6. The collapsible multi-rotor UAV of claim 1, wherein the main flight computer board is an APM 2.5.2 board.

7. The collapsible multi-rotor UAV of claim 1, wherein the battery is a lithium polymer battery.

8. The collapsible multi-rotor UAV of claim 1 having 4 rotor arms, 4 rotor motors and 4 rotors.

\* \* \* \* \*